Oct. 4, 1932.  W. A. MORTON ET AL  1,880,268
LEER
Filed March 8, 1930  2 Sheets-Sheet 1
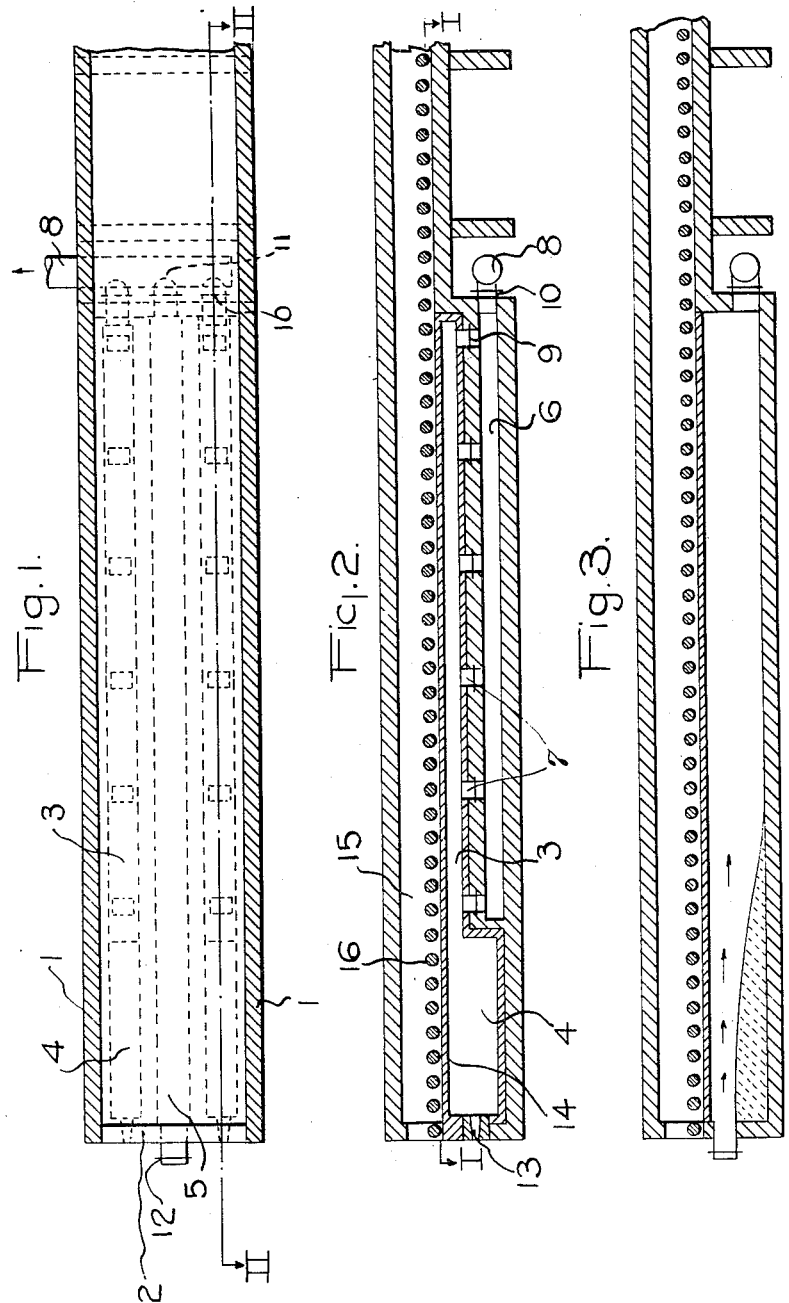
INVENTOR
Elisha W Paxton
William A. Morton
by William B Jaspert
Attorney Oct. 4, 1932.  W. A. MORTON ET AL  1,880,268
LEER
Filed March 8, 1930  2 Sheets-Sheet 2
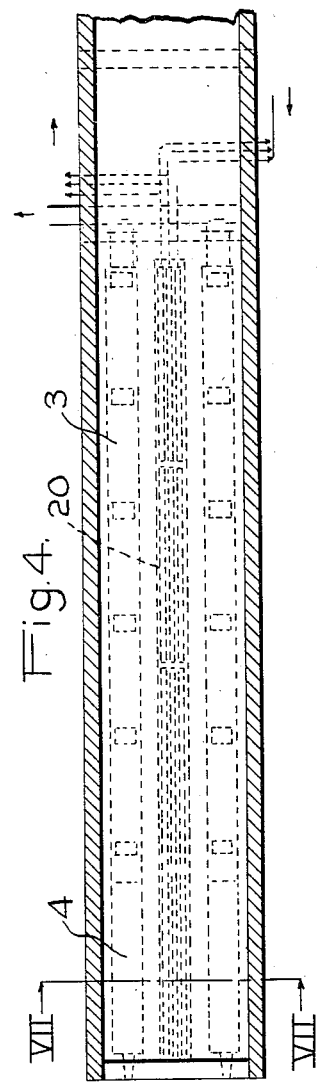
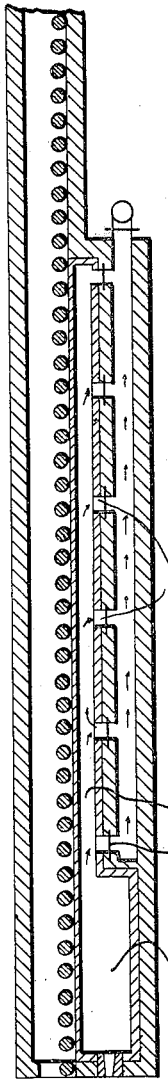
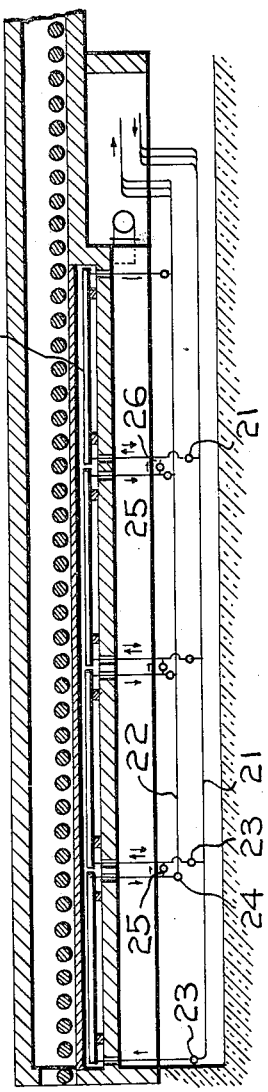
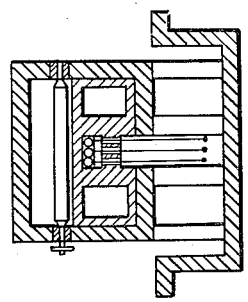
INVENTOR
Elisha W. Paxton
William A. Morton
by William B. Jaspert
Attorney Patented Oct. 4, 1932

1,880,268

UNITED STATES PATENT OFFICE

WILLIAM A. MORTON, OF PITTSBURGH, AND ELISHA W. PAXTON, OF WASHINGTON, PENNSYLVANIA; SAID PAXTON ASSIGNOR TO HIGHLAND WESTERN GLASS COMPANY, OF WASHINGTON, PENNSYLVANIA, A CORPORATION OF DELAWARE

LEER

Application filed March 8, 1930. Serial No. 434,396.

This invention relates to glass annealing leers, more especially to improvements in leer structures whereby the temperature gradient is controllable longitudinally and transversely of the leer throughout its original annealing range.

In the annealing of plate glass for example, it is extremely difficult to maintain a thermal balance transversely of the hot glass while it is passing through the leer, this difficulty being largely due to the difference in heat losses by radiation and conductivity produced primarily through the agency of the supports on which the hot glass is carried.

In accordance with this present invention, provision is made for establishing independently regulable heating and cooling zones in the critical portion of the leer whereby the above mentioned difficulties may be overcome.

The novel features of the invention will become more apparent from a consideration of the accompanying drawings in which like reference characters designate like parts and in which Fig. 1 is a horizontal section of an annealing leer taken along the line I—I, Fig. 2; Fig. 2 a vertical cross sectional view taken along the line II—II, Fig. 1; Fig. 3 a cross sectional view taken through the central cooling flue of the leer shown in Fig. 1; Fig. 4 a sectional elevational view of a modification of the leer shown in Fig. 1; Fig. 5 a vertical sectional view of the leer shown in Fig. 4; taken through the heating flues; Fig. 6 a cross sectional view taken through the longitudinal central line of Fig. 4; and Fig. 7 a cross sectional view taken along the line VII—VII of Fig. 4.

With reference to Figs. 1, 2 and 3 of the drawings, the leer structure therein illustrated comprises a plurality of side walls 1, an end wall 2, a plurality of bottom flues 3 communicating with the front fire boxes 4, a central cooling flue 5, Fig. 1, and exhaust flues 6 communicating through passages 7 with the heating flues 3 and connected to a common exhaust line 8. The passages 7 and the connections to the exhaust line 8 are provided with dampers 9 and 10, respectively, to provide for the independent regulation of the passages which they control. The central cooling flue 5 is shown in Fig. 1 to be connected to the exhaust line 8 and provided with a damper 11 at the connecting end and a damper 12 at the front end of the leer.

The fire boxes 4 are provided with burner ports 13 for the injection of a gaseous fuel which is consumed in the fire boxes 4 and the products of combustion are conducted through the side heating flues 3 and through any one of the passages 7 to the exhaust line or flue 6. The several flues are divided from the annealing chamber of the leer by a relatively thin hearth structure 14 to obtain maximum heat exchange between the flues and the annealing chamber 15. A series of rollers 16 are provided for supporting the plate glass and for causing it to travel from the front end of the leer through the annealing chamber and the contiguous cooling chamber to the discharge end of the leer. The rollers are driven by suitable actuating mechanism which constitutes no part of the present invention.

In the operation of the leer described in connection with Figs. 1 and 2, proper thermal balance transversely of the glass sheet is obtained by either regulating the burners to vary the temperature in the fire boxes 4 and communicating side flues 3 or by bleeding air into the central cooling flue 5 the amount of air drawn through the flue being controlled by the adjustment of dampers 11 and 12; or both of these means for regulating the temperature may be employed. For example, if as the glass advances through the leer, it has a tendency to cool at its edges, the bleeding of air through the central cooling flue may be employed to balance the thermal condition; or the edges of the glass may be subjected to increasing temperatures by the heat of the side flues 3 without drawing cold air through the cooling flue 5. If, as the glass continues through the leer, the unbalancing of the temperature varies, adjustments may be made by the regulation of the various dampers 9 which are in the longitudinally spaced passages 7 of the heating flues, and at the same time the dampers 11 and 12 may be adjusted to regulate the degree of cooling effect produced by the cooling flue at the center of the glass sheet.

Referring to the leer structure disclosed in Figs. 4 to 7 inclusive, a series of banks of tubes or conduits 20 are employed in the central portion of the leer, these banks being located between the side heating flues 3. The banks of tubes are connected to feed lines 21 and return lines 22 which are diagrammatically illustrated in Figs. 4, 6, and 7. The feed lines lead to a source of supply for a heating or cooling medium, and the feed and return lines are regulable through suitable control valves 23, 24 and 25, to cut out or put into service any or all of the tube banks.

The tubes 20 may serve to either heat or cool the central section of the leer by circulating water or air as a cooling medium or steam or hot gases as a heating medium therethrough. The feed lines and return lines are provided with by-pass connections 26 by means of which the heating or cooling fluid from the first bank of tubes at the front of the leer may be conducted through all of the other banks by opening the by-pass valves 25 and closing all the valves 23 excepting the front valve controlling the front tube bank. By manipulation of the valves, the tubes may be connected either in series or in parallel with the cooling or heating source.

The side flues 3 and fire boxes 4 serve the same purpose as set forth in connection with the foregoing figures of the drawings and the combination disclosed in Figures 4 to 7 inclusive possesses precisely the same operating characteristics as disclosed in connection with the foregoing figures of the drawings, excepting that more positive temperature regulation is available through the individual banks of tubes than through a single cooling flue.

Although the invention has been illustrated as an embodiment of a plate glass annealing leer, it will be obvious that the same heating and cooling features may be utilized in leers for annealing glassware, such as bottles or the like, wherein an endless belt conveyor or work carrying pans may be employed in place of the rollers 16.

It is evident from the foregoing description of this invention that glass annealing leers constructed in accordance therewith provide for positive and convenient regulation of the thermal conditions longitudinally and transversely of the annealing chamber and that by disposing the heating and cooling flues adjacent the annealing chamber from which it is separated by a thin wall, the heat exchange will be very effective and regulation of temperature may be quickly obtained.

Although several embodiments of the invention have been herein illustrated and described, it will be obvious to those skilled in the art that various modifications may be made in the details of construction without departing from the principles herein set forth.

We claim:

1. A glass annealing leer comprising in combination an annealing chamber, a plurality of banks of tubes disposed centrally of and longitudinally underneath the said annealing chamber, feed lines connecting said banks leading to a source of temperature controlling medium, and return lines connected to said banks of tubes for the said medium and means for connecting said banks in parallel or series with the said feed line.

2. A glass annealing leer comprising in combination an annealing chamber, a plurality of heating flues adjacent the side walls below said chamber, a cooling flue below said chamber and disposed between said heating flues, exhaust flues for said heating flues, combustion chambers communicating with one end of said heating flues, said heating flues having a plurality of damper controlled passages spaced longitudinally and communicating with said exhaust flues, means for regulating said dampers to control the temperature in said tunnel adjacent the side walls thereof whereby to maintain different temperature zones in the annealing chamber, and means for regulating said cooling flue to obtain different temperature zones centrally of said heating chamber.

3. A glass annealing leer comprising in combination an annealing chamber, a plurality of heating flues and exhaust flues in superposed relation adjacent the side walls and below said annealing chamber, cooling means between said heating flues and below said chamber, means dividing said cooling means into different temperature zones longitudinally of said chamber, and damper controlled passages between said heating flues and exhaust flues whereby the temperature in said heating flues may be varied longitudinally of the annealing chamber.

In testimony whereof we have hereunto set our hands this 18th day of February 1930.

WILLIAM A. MORTON.
ELISHA W. PAXTON.